June 21, 1966 K. V. MATTHEWS ETAL 3,256,769
OSCILLATING BEAM SWITCHING MIRROR MOUNT FOR USE
IN A SPECTROPHOTOMETER
Filed Aug. 18, 1961 4 Sheets-Sheet 1

INVENTORS
ROBERT APPEL
KENNETH V. MATTHEWS
DONALD G. TIPOTSCH
BY
Robert M. Taylor, Jr.
ATTORNEY INVENTORS
ROBERT APPEL
KENNETH V. MATTHEWS
DONALD G. TIPOTSCH
BY Robert M. Taylor, Jr.
ATTORNEY INVENTORS
ROBERT APPEL
KENNETH V. MATTHEWS
DONALD G. TIPOTSCH
BY
*Robert M. Taylor, Jr.*
ATTORNEY

POSITION OF ARMATURE 39

VOLTAGE ON GRID OF TUBE 70

CURRENT TRAVERSING COIL 44

*INVENTORS*
ROBERT APPEL
KENNETH V. MATTHEWS
BY    DONALD G. TIPOTSCH

*Robert M. Taylor, Jr.*
ATTORNEY

United States Patent Office 3,256,769
Patented June 21, 1966

3,256,769
OSCILLATING BEAM SWITCHING MIRROR MOUNT FOR USE IN A SPECTROPHOTOMETER
Kenneth V. Matthews, Garden Grove, Robert M. Appel, Fullerton, and Donald G. Tipotsch, Placentia, Calif., assignors to Beckman Instruments, Inc., a corporation of California
Filed Aug. 18, 1961, Ser. No. 132,364
14 Claims. (Cl. 88—14)

This invention relates to spectrophotometers and more particularly relates to spectrophotometers wherein a beam of radiation is alternately exposed to the influence of a sample object and a reference object in order to produce signals which can be compared for analytical purposes.

U.S. Patent No. 2,868,060 issued January 13, 1959, to K. A. L. Akerman and K. E. Sundstrom and assigned to the assignee of this application discloses apparatus for directing a beam of monochromatic radiation from a radiation source to a detector alternately through a sample object and a reference object. The patented apparatus includes a pair of parallel mirrors which are placed on a platform connected by a parallel linkage to a stationary base, the platform being oscillated by an electromagnetic device energized by alternating current. Although the patented apparatus is satisfactory in operation, it has been found to require relatively large amounts of electrical energy to move the oscillating structure and to need occasional adjustment or replacement of parts.

According to the present invention, a spectrophotometer is provided which is more compact, sturdier and requires less energy to operate than any heretofore known. In the present spectrophotometer, an oscillating structure carrying a pair of parallel mirrors has as an integral member an armature of an electromagnetic device. A coil mounted on a stationary framework magnetizes the armature with alternating polarity, causing it to be alternately repelled and attracted by a permanent magnet mounted on the framework. A novel electrical circuit, including a pair of photoelectric devices responsive to the oscillations of the armature, controls the energization of the coil and thus the amplitude of the oscillations of the mirrors.

It is therefore a primary object of the present invention to provide a spectrophotometer having an oscillating structure, a portion of which serves as the armature of an electromagnetic device.

It is a further object of the present invention to provide a spectrophotometer having an oscillating structure which oscillates at its natural frequency.

It is a still further object of the present invention to provide a spectrophotometer having an oscillating structure and which requires input energy only to overcome the effects of damping on the oscillating structure.

It is another object of the present invention to provide an electrical circuit for controlling the oscillation of an oscillating structure.

It is also an object of the present invention to provide an electrical circuit having a plurality of photoconductive elements as essential parts thereof, the conductivity of said photoconductive elements being determined by the oscillations of an oscillating structure and in turn controlling said oscillations.

These and further objects and advantages of the invention will become more apparent upon reference to the following specification and claims and appended drawings wherein:

Figure 1:
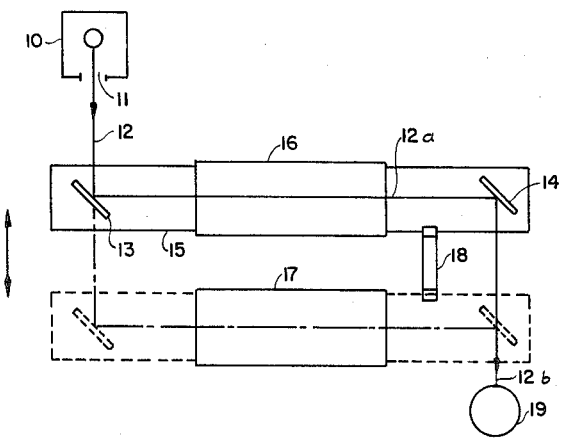
FIG. 1 is a schematic plan view of the optical circuit of the present invention.

Reefrring now to the several drawings, and more particularly to FIG. 1, there is shown a monochromator 10 having an exit slit 11 through which a narrow beam of substantially parallel monochromatic radiation is directed along a path 12. The beam of radiation impinges on a mirror 13, which together with a second mirror 14 is mounted on a platform 15. The mirror 13 is placed at an angle of 45 degrees with respect to the beam of radiation emanating from the monochromator 10 and reflects the beam along a path 12a perpendicular to its original path. The reflected beam of radiation then impinges on the second mirror 14 which is positioned parallel to the mirror 13. The beam of radiation is thus again reflected and travels along a path 12b which is parallel to and spaced from the original path 12.

The platform 15 upon which the mirrors 13 and 14 are mounted is caused, by means which will be hereinafter described, to reciprocate in a direction parallel to the beam paths 12 and 12b. Because the mirrors 13 and 14 are mounted on the platform 15, and are parallel, the beam paths 12 and 12b remain parallel to each other during the platform reciprocation.

Two positions of the platform 15 and mirrors 13 and 14 are shown in FIG. 1, the first position being shown by full lines and the second by dotted lines. In the first position, the portion of the beam traveling along path 12a passes through a stationary sample cell 16 that is provided with radiation transparent windows at the front and the rear ends thereof. In the second position of the platform, the beam passes through a stationary reference cell 17, preferably similar in structure to the sample cell 16. In both positions of the platform, the beam reflected from the mirror 14 and traveling along the path 12b impinges upon a stationary radiation detecting device 19. When the platform 15 is in a position intermediate the two positions shown, the beam is interrupted by a stationary mask or opaque element 18 so that no radiation impinges upon the detecting device 19.

When the device is in operation, the platform 15 is caused to oscillate between the two extreme positions shown. In the vicinity of the first extreme position, i.e., the one shown by full lines, the beam passes through the stationary sample cell 16. As the platform moves towards a central position, the beam strikes the mask 18 and is blocked. The platform continues to move until it is in the position shown by dotted lines and the beam passes through the reference cell 17. The platform then reverses direction and moves towards the central position where the beam is again blocked by the mask 18. As a result of this oscillating movement of the platform and the mirrors mounted thereon, the detector device 19 detects two discrete signals, one from the sample cell and one from the reference cell. A comparison of these signals provides information on the optical characteristics of the sample contained in the sample cell 16 in relation ot the characteristics of the material contained in the reference cell 17. Apparatus for making this comparison has been disclosed in the aforementioned Akerman and Sundstrom patent and does not form part of the present invention.

Figure 2:
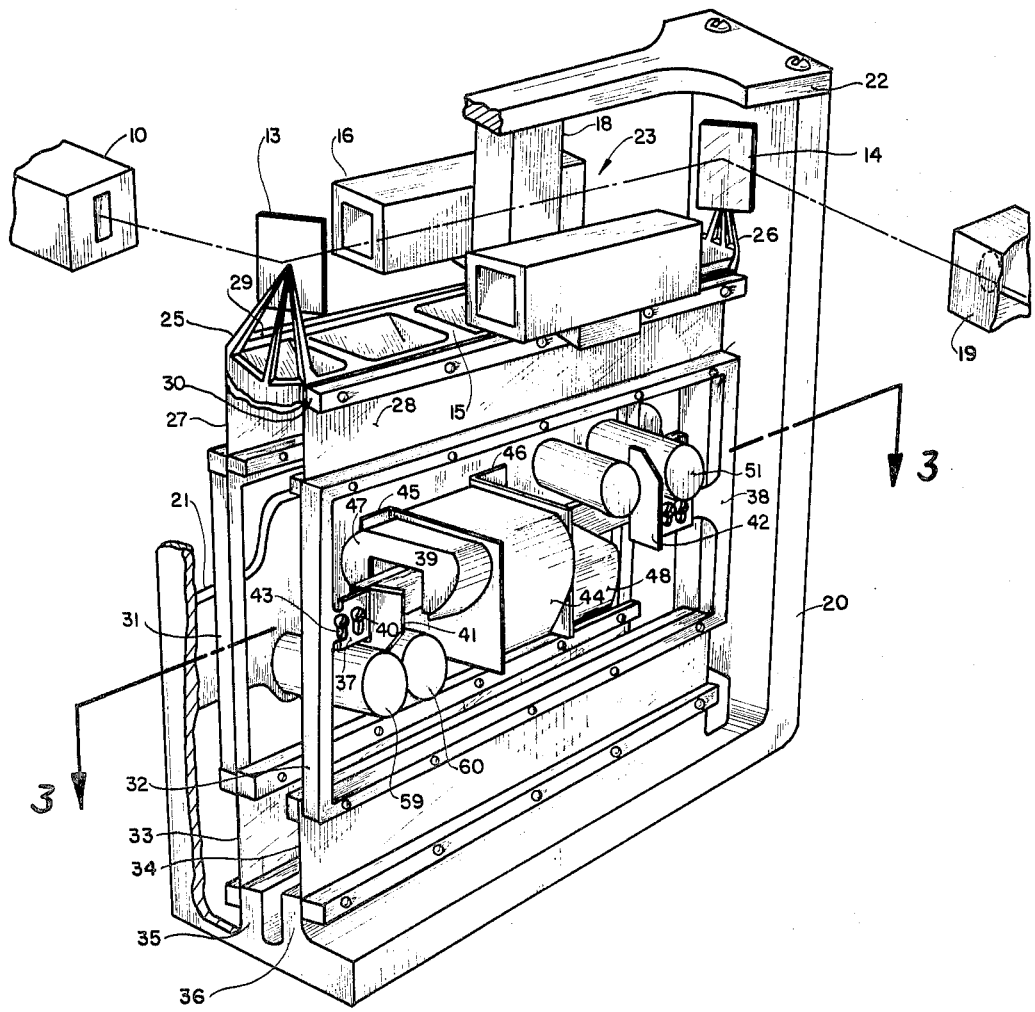
FIG. 2 is a perspective view of the apparatus of the present invention.

Referring now to FIG. 2, the apparatus for oscillating the platform 15 is shown. A generally U-shaped frame 20 is provided and is mounted by conventional means on a suitable member of the spectrophotometer. In the interest of clarity, only the rear leg of the U is shown in full, the front leg being shown broken away in order to enable a better showing of other parts of the apparatus. The tops of the upstanding legs of the frame 20 have mounted thereon a plate 22, only the rear portion of which is shown.

Sample cell 16 and reference call 17 are fixedly attached to the top plate 22 by means of a T-shaped bracket 23, the leg 18 of which serves as the opaque mask described in connection with FIG. 1. Mouting of the sample and reference cells in this manner maintains them in fixed relationship to the frame 20, unaffected by the motion of the oscillating structure to be hereinafter described.

A crossbar 21, preferably having a widened portion intermediate its ends, is fixedly attached at the rear of the frame 20 and connects the two upstanding legs thereof. This crossbar may be attached in any conventional manner to the frame or may be cast or formed as an integral part therof. The crossbar 21 serves as a mount for many of the stationary portions of the apparatus, as will be fully described below.

The mirrors 13 and 14 are mounted on the platform 15 by means of any suitable mounting brackets 25 and 26. The platform 15 is preferably made of a light material such as aluminum and shaped so that it has a maximum of rigidity, for example, by casting it as a relatively thin-walled, cellular structure.

The sides of the platform 15 are attached to reed members 27 and 28 by means of suitable assembly strips 29 and 30. The reed members 27 and 28 are clamped between the platform 15 and the assembly strips 29 and 30 and firmly held in place by means of rivets or other suitable fastening means.

Rectangular link members 31 and 32, preferably having a shape generally similar to that of a picture frame, have their uppermost portions attached to the lower edges of reeds 27 and 28 respectively. Preferably, the link members and reeds are fastened together in the same manner as described above in connection with the reeds and the platform 15. In this instance, the assembly strips are located in the interior of the enclosure formed by the reeds, and the members fastened together by rivets or the like. The lower portions of the link members 31 and 32 are fastened to a second pair of reeds 33 and 34 in a manner identical to that described in connection with reeds 27 and 28. The lower edges of reeds 33 and 34 are attached to projections or ridges 35 and 36 of the frame 20 by use of assembly strips and rivets in the manner descrived previously.

By properly dimensioning the platform 15 and the projections 35 and 36, the distance between the reeds 27 and 28 will be equal to that between the reeds 33 and 34. The links 31 and 32 should be oriented in parallel relationship in order to prevent the creation of any undue stress in the reeds. It will be readily understood that the structure outlined above enables the platform to be moved from one extreme position to another while always remaining parallel to the plate 22 which is mounted on the frame 20 and supports the sample cell 16 and the reference cell 17.

The link 32 is provided with a pair of integral tabs 37 and 38 which project inwardly and parallel to the top and bottom portions of the link. A strip 39 of magnetizable material, for example, silicon steel is fastened at its ends to the tabs 37 and 38 by nut and bolt assemblies 40. Also fastened to the tabs 37 and 38 by nut and bolt assemblies 40 are vanes 41 and 42 respectively. The vanes 41 and 42 are made of flat material bent at a right angle and the portions of the vanes that are affixed to the tabs 37 and 38 are provided with two oblong slots 43 such that the vane may be adjusted vertically after loosening the nut and bolt assemblies 40. The function of these vanes will be more completely described hereinbelow.

Figure 4:
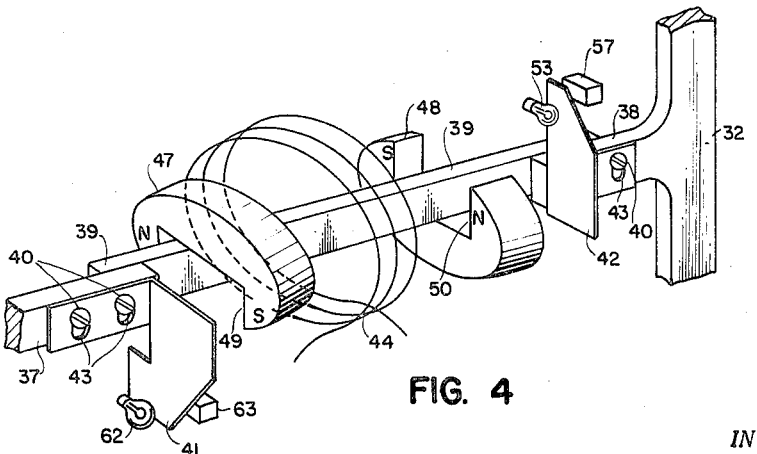
FIG. 4 is a partially schematic view of the electromagnetic device utilized in the present invention.
Figure 3:
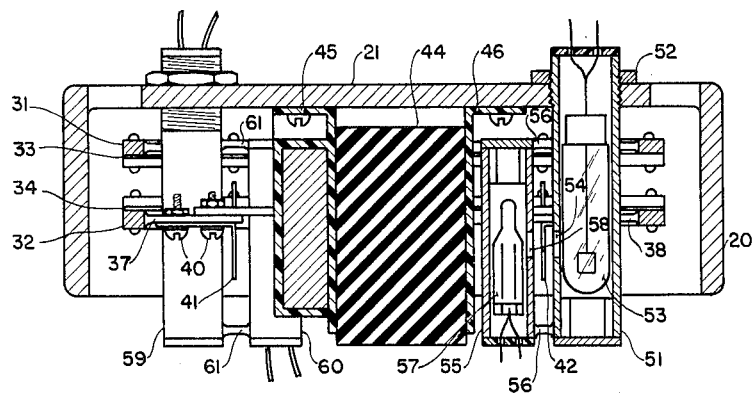
FIG. 3 is a view taken along line 3—3 of FIG. 2.

Referring now to FIGS. 3 and 4, as well as to FIG. 2, it can be seen that the strip 39 of magnetizable material serves as the armature of an electromagnetic device. A coil 44 is fixedly attached to the crossbar 21 in any suitable fashion, for example, by means of L-shaped mounting brackets 45 and 46. These mounting brackets 45 and 46 also serve to support a pair of permanent magnets 47 and 48. The mounting brackets 45 and 46 may be of any suitable material, and if desired, may be cast so as to include a portion which surrounds the magnets 47 and 48 and holds them securely in place. The coil 44 may then be secured to the inner surfaces of the mounting brackets by any suitable adhesive. It is to be understood, of course, that any other suitable method of mounting the coil and the permanent magnets is within the scope of the present invention.

The permanent magnets 47 and 48 are arranged so that their magnetic fluxes travel in opposite directions. As shown in FIG. 4, the north pole of the magnet 47 is closest to the crossbar 21 while the south pole of the magnet 48 is closest to this crossbar. The positions of these magnets could, of course, be reversed. The magnets 47 and 48 are provided with slots 49 and 50, respectively, through which passes the strip or armature 39. The coil 44 is provided with a slot (not shown) of similar dimensions to the slots 49 and 50. These slots permit the lateral movement of the strip or armature 39 with the concomitant movement of the entire oscillating structure previously described including the platform 15 and the mirrors 13 and 14 mounted thereon.

In operation, a current is passed through the coil 44 causing the armature 39 to become magnetized. When the current passed through the coil 44 in one direction, the left end of the armature 39 becomes a north pole and the right end of the armature becomes a south pole. With the permanent magnets 47 and 48 arranged as shown, the left end of the armature 39 will be forced away from the north pole of the permanent magnet 47 and attracted to its south pole. At the same time, the right-hand end of the armature 39 will be forced away from the south pole of the magnet 48 and attracted by the north pole of this magnet. The armature 39 will thus move, together with the rest of the oscillating structure, toward the front of the frame so that the plaform 15 and the mirrors 13 and 14 will assume the position shown in dotted lines in FIG. 1. If the current is now reversed, the armature 39 will be caused to move in the opposite direction. It will be readily seen that by applying an alternating current to the coil 44 and thus alternately polarizing the armature 39, the platform 15 will be caused to oscillate between the two positions shown in FIG. 1.

In order that the energy required to drive the electromagnetic device be kept at a minimum, it is necessary for the oscillating structure to oscillate at its natural frequency. If the oscillating structure is vibrated at its natural frequency, input energy will be needed only to overcome the effects of damping. The input current to the coil 44 should thus be of the same frequency as the natural frequency of the oscillating structure and be properly phased in relation to the structure oscillation.

Referring again to the several figures, a holder 51 is mounted on the crossbar 21 in any suitable fashion, for example, by being screwed into a hole in the crossbar and being held in place by a nut 52. The holder 51 houses a lamp 52 which is disposed adjacent a slot 54 in the holder. A casing 55 is mounted on the housing 51 by any suitable brackets 56. The casing 55 houses a photoconductor 57 which is positioned adjacent an aperture 58. The aperture 58 of the casing 55 is aligned with the aperture 54 of the housing 51 so that light from the lamp 53 can impinge on the photoconductor 57.

In a similar manner, a housing 59 is mounted on the crossbar 21 and supports a casing 60 by means of suitable brackets 61. The housing 59 and casing 60 mount a lamp 62 and a photoconductor 63 (shown in FIG. 4) similar in all respects to the lamp 53 and photoconductor 57.

As can be seen from the several figures, the vane 42 is mounted on the armature 39 to protrude between the apertures 54 and 58 while the vane 41 is mounted on the armature 39 to protrude between a pair of similar apertures (not shown) formed in the housing 59 and casing 60. The vane 42 is mounted relative to the apertures so that the radiation coming from the lamp 53, passing through the apertures 54 and 58, and falling on the photoconductor 57 is blocked entirely by the vane 42 when the oscillating structure is in one of its extreme positions and becomes unblocked gradually as the oscillating structure moves to its other extreme position. The vane 41, on the other hand, is adjusted so that the photoconductor 63 is unblocked only when the oscillating structure is at its second extreme position, that is, the position where a large portion of the radiation from the lamp 53 falls on the photoconductor 57. At all other times, the vane 41 blocks the optical path between the lamp 62 and photoconductor 63.

Figure 5:
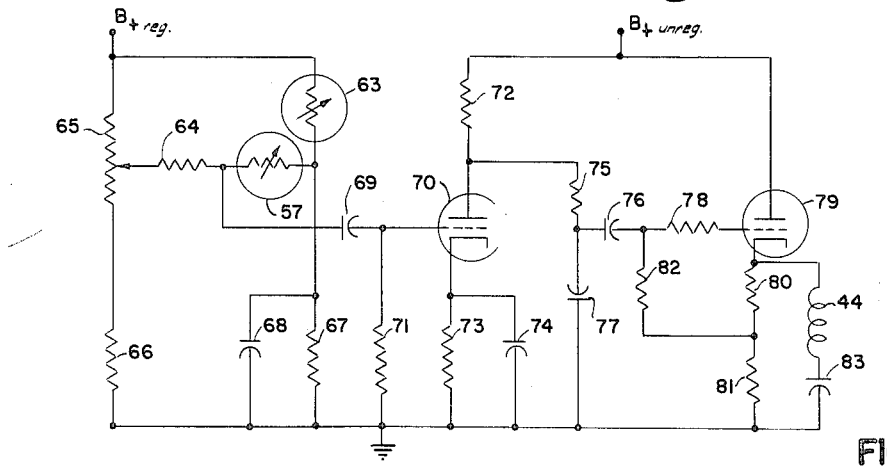
FIG. 5 is a schematic diagram of the circuitry employed in the present invention.

Referring now to FIG. 5, there is shown an electrical circuit for controlling the current supplied to the coil 44. In this circuit, the photoconductor 57 is connected through a resistor 64 to the tap of a potentiometer 65. The potentiometer 65 is connected between a highly regulated power supply marked B+ reg. and through a resistor 66 to ground. The photoconductor 63 is connected between this regulated power supply and the other terminal of the photoconductor 57. This junction is connected through the parallel combination of a resistor 67 and a capacitor 68 to ground.

The junction between photoconductor 57 and resistor 64 is connected through a capacitor 69 to the grid of a vacuum tube 70. The grid is connected to ground through a resistor 71. The anode of the vacuum tube 70 is connected through a load resistor 72 to an unregulated power supply indicated by B+ unreg. The cathode of tube 70 is connected through a resistor 73 to ground, the resistor being shunted by a capacitor 74. The output of the tube 70 is connected through a resistor 75 to a capacitor 76, the junction of this resistor and capacitor being connected to ground through a capacitor 77.

Capacitor 76 is also connected through a resistor 78 to the grid of a triode 79 which has its anode connected to the unregulated power supply and its cathode connected to ground through the series combination of the resistors 80 and 81. A biasing resistor 82 is connected between the junction of the capacitor 76 and resistor 78 and the junction between the resistors 80 and 81. The coil 44 and a capacitor 83 are connected in series across the resistors 80 and 81.

As is well known, photoconductive elements such as those made of cadmium sulphide and cadmium selenide exhibit a high resistance when they are in the dark and a relatively low resistance when they are illuminated. These photoconductors also exhibit a time delay characteristic, that is, there is a lag between the incidence of light and a change in resistance. This results in a phase difference between the electrical output and the light input which is, of course, dependent on the material used. These characteristics are utilized in the operation of the circuit shown in FIG. 5, as will be described below.

As described above, the oscillation of the armature 39 causes the vane 42 to gradually unblock the optical path between the apertures 54 and 58 as the armature moves in one direction, and then to gradually block this optical path as the armature moves in the other direction. Since the vane 41 unblocks the optical path between the lamp 62 and the photoconductor 63 only at an extreme position of the armature, the effect of the photoconductor 63 on the circuit may be disregarded for small amplitudes of armature oscillation.

As the photoconductive element 57 is gradually uncovered and covered by the vane 42 it changes its conductance, as a result of which voltage fluctuations appear at its junction with resistor 64. The voltage fluctuations appearing at this junction are applied to the grid of triode 70 and appear in amplified form and 180° out of phase at the anode thereof. As pointed out above, the fluctuations at the junction of the photoconductor 57 and the resistor 64 are somewhat out of phase with the movement of the mechanically oscillating structure because of the delayed response of the photoconductor to the variations of light impinging thereon.

The signals appearing at the plate of the tube 70 are then passed through a phase-shifting network comprising the resistor 75 and capacitor 76 to the grid of the triode 79. The triode 79 is connected as a cathode follower. The cathode follower is utilized as a variable impedance between the power supply and circuit ground and controls the current to the coil 44. The capacitor 83 connected in series with the coil 44 prevents flow of direct current through the coil, thereby keeping heat development in the coil to a minimum. The resistors 80, 81 and 82 provide the proper bias for the tube 79.

In order to maintain a structure in oscillation while supplying a minimum input of electrical energy to the structure, current should be supplied to the coil driving the structure 90° out of phase with the movement of the structure itself. If this is the case, the current, and the corresponding force exerted on the structure, will be at a maximum when the structure passes through its zero position and will be zero and reversing sign when the structure reaches its extremes. As has been pointed out above, the inherent delay of the photoconductor 57 provides some of this phase shift. The phase shift provided by the network comprising the resistor 75 and capacitor 76 provides the remainder of the necessary phase shift so that the current traversing the coil 44 will be 90° out of phase with the mechanical oscillation of the system.

Figure 6A:
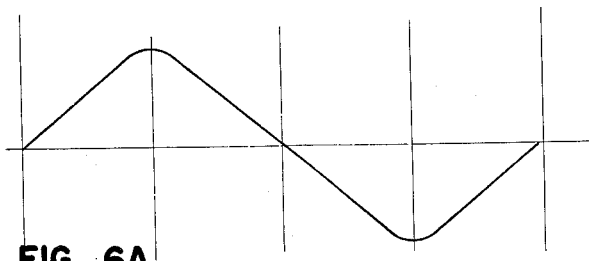
FIGS. 6A, 6B and 6C are waveforms showing the relationships between various parts of the invention.
Figure 6B:
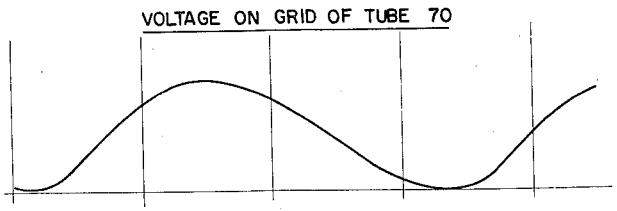
Figure 6C:
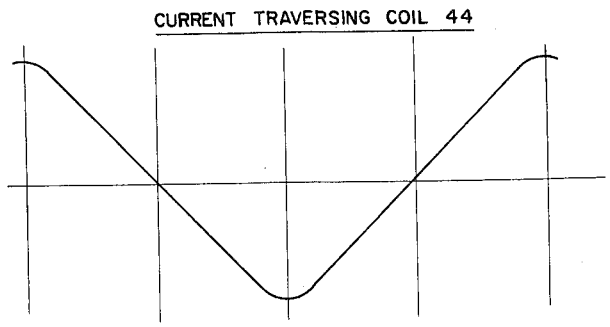

The above described relations can be clearly seen by referring to FIGS. 6A, 6B and 6C. FIG. 6A represents the position of the armature 39 and thus the entire oscillating structure. FIG. 6B represents the voltage on the grid of tube 70. It can be seen that the inherent delay characteristic of the photoconductor 57 causes this voltage to lag behind the position of the armature 39. The capacitor 69 acts as an integrator and causes the wave form to be evened out into what approximates a sine wave. FIG. 6C represents the current traversing the coil 44.

As can be seen, the current is 90° out of phase with the position of the armature 39 due to the accumulative effects of the inherent delay in the photoconductor and the effect of the phase-shifting network. Although this phase relationship is desirable to minimize the energy input, it is not necessary to the operation of the system. Other phase relationships will also satisfactorily drive the oscillating structure, although at some loss of energy. It should also be obvious that any photoconductive material may be used for the photoconductor 57 with the parameters of the phase-shift network selected to provide the complementary phase-shift necessary to achieve the desired result.

By properly connecting the coil 44, the system is provided with regenerative feedback. That is, small fluctuations of the mechanical structure will be sensed by the photoconductor 57 and the resultant electrical signals will be amplified and applied to the coil 44 causing greater oscillations of the mechanical structure. Consequently, the system does not need to be started other than by connecting the power supplies. When these power supplies are connected, the small mechanical vibrations that are always present under practical circumstances cause small voltage fluctuations to appear at the junction of the photoconductor 57 and the resistor 64, such flucuations being amplified in the manner described and therefore causing the amplitude of the oscillations to increase rapidly. Potentiometer 65 permits the regulation of the amplitude of these voltage fluctuations and accordingly makes it possible to regulate the amplitude of the oscillations.

As the amplitude of the oscillations of the mechanical structure increases, the mechanical structure will soon reach its extreme desired position with the result that the photoconductive element 63 is exposed to the radiation from the lamp 62. During the period that the resistance of element 63 becomes low because of the light impinging thereon, current flows through resistor 67 causing a voltage drop thereacross. This voltage drop causes the capacitor 68 to charge, causing the voltage at the junction between the photoconductor 63 and the resistor 67 to rise above ground potential. As this voltage also determines the current that flows through the resistor 64 and photoconductor 57, it is obvious that the voltage fluctuations appearing at their junction will be reduced. This in turn limits the current fluctuations in coil 44 and consequently limits the amplitude of the oscillations of the mechanical structure.

It can be seen from the circuit shown in FIG. 5 that this circuit does not contain elements that determine the frequency of oscillations of the mechanical system, this being exclusively determined by the natural frequency of the mechanical elements. As a result, the system has only to supply the mechanical energy that is lost by damping (substantially air damping). It is thus seen that a system is provided for keeping the optical parts of a spectrophotometer in oscillation at a constant amplitude with a minimum energy input. Since no forces are mechanically applied to the oscillating structure and it oscillates at its natural frequency, the apparatus is sturdy and dependable over long periods of operation.

The invention may be embodied in other specific forms not departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

We claim:

1. In a spectrophotometer, the combination comprising a support, optical means mounted on said support, said optical means being movable between two extreme positions and including a magnetizable member, means mounted on said support for magnetizing said magnetizable member to induce opposite magnetic poles at opposite ends thereof, means responsive to said magnetization to cause said optical means to move toward one of said two positions depending upon the polarity of said induced poles, and means responsive to said movement for controlling said magnetizing means to periodically reverse the polarity of said poles thereby causing said optical means to oscillate.

2. In a spectrophotometer, the combination comprising a support, means mounted on said support and movable between two extreme positions, said movable means carrying optically reflective means and including a magnetizable member, coil means mounted on said support for magnetizing said magnetizable member to induce opposite magnetic poles at opposite ends thereof, at least one magnetic means mounted on said support for repelling and attracting said magnetizable member depending upon the polarity of said induced poles, and means responsive to movement of said movable means to control a current supplied to said coil means for periodically reversing the polarity of said poles thereby causing said movable means to oscillate.

3. In a spectrophotometer, the combination comprising a support, means mounted on said support, said means being movable between two extreme positions and including a magnetizable member, coil means mounted on said support for magnetizing said magetizable member to induce opposite magnetic poles at opposite ends thereof, at least one permanent magnet mounted on said support for repelling and attracting said magnetizable member depending upon the polarity of said induced poles so as to cause movement of said movable means, means responsive to said movement for controlling a current supplied to said coil means such that the polarity of said poles is periodically reversed thereby causing oscillation of said movable means, and means responsive to the amplitude of said oscillations to limit said amplitude to a predetermined value.

4. In a spectrophotometer, the combination comprising a support; oscillatable means mounted on said support, said oscillatable means comprising a first pair of reed members fixedly attached to said support, a pair of rectangular linking members attached to said reed members, a second pair of reed members attached to said linking members, and optical means carried by said second pair of reed members, one of said linking members including a magnetizable member; a coil mounted on said support and cooperating with said magnetizable member to magnetize said member to induce opposite magnetic poles at opposite ends thereof; at least one permanent magnet mounted on said support for repelling and attracting said magnetizable member depending upon the polarity of said induced poles to cause said oscillatable means to move between two positions; means responsive to said movement for conrtolling a current supplied to said coil for periodically reversing the polarity of said induced poles so as to cause said oscillatable means to oscillate between said two positions, and means responsive to the amplitude of said oscillations to limit a current supplied to said coil and thereby limit the amplitude to a predetermined value.

5. In a spectrophotometer of the type having an oscillating structure whose oscillations are controlled by the energization of a coil, the combination comprising: a source of current; variable impedance means; said current source, said variable impedance means and said coil being connected in a series circuit; amplifier means for controlling the impedance of said variable impedance means and thereby the current flowing in said coil; photoconductive means coupled to said amplifier means for controlling the output thereof; a source of radiation located adjacent said photoconductive means; and means coupled to said oscillating structure for gradually varying the amount of radiation from said radiation source that impinges on said photoconductive means as said oscillating structure oscillates.

6. In a spectrophotometer of the type having an oscillating structure whose oscillations are controlled by the energization of a coil; a source of power, variable impedance means connected in a series circuit with said source of power and said coil, amplifier means connected in parallel with said source of power, the impedance of said variable impedance means being controlled by the output of said amplifier means, photoconductive means, means coupling said photoconductive means to said amplifier means whereby changes in the conductivity of said photoconductive means cause changes in the output of said amplifier means, a source of radiation located adjacent said photoconductive means, and means coupled to said oscillating structure for gradually varying the amount of radiation passing from said source of radiation to said photoconductive means as said oscillating structure oscillates.

7. A system for controlling the oscillations of an ocillating structure comprising, a photoconductive device, a source of radiation located adjacent said photoconductive device, means coupled to said oscillating structure for determining the amount of radiation passing from said source of radiation to said photoconductive device, said means gradually varying the amount of radiation from a maximum to a minimum as said oscillating structure oscillates between extreme positions, a coil, energization of said coil causing oscillations of said oscillating structure; means for energizing said coil, and means coupled to and controlled by said photoconductive means for controlling said coil energizing means.

8. In a spectrophotometer of the type having an oscillating structure whose oscillations are controlled by the energization of a coil from a power source, the combination of a coil, variable impedance means connected in a series circuit with said coil, an amplifier means, phase shifting means, said phase shifting means coupling the output of said amplifier means to said variable impedance means whereby the impedance of said variable impedance means is controlled by said amplifier means, photoconductive means, means coupling said photoconductive means to said amplifier means whereby changes in the conductivity of said photoconductive means cause changes in the output of said amplifier means, a source of radiation located adjacent said photoconductive means, and means coupled to said oscillating structure for varying the amount of radiation passing from said source of radiation to said photoconductive means and thereby determining the current flowing through said coil.

9. The combination of claim 8 including means responsive to the amplitude of the oscillations of said oscillating structure for modifying the output of said amplifier means.

10. The combination of claim 9 wherein said amplitude responsive means include second photoconductive means, a second source of radiation, and second means coupled to said oscillating structure for permitting radiation to pass from said second source of radiation to said second photoconductive means only when the amplitude of the oscillations of said oscillating structure exceed a predetermined value.

11. The combination of claim 9 wherein said photoconductive means has a time delay characteristic, said time delay characteristic and said phase shifting means combining to cause said energization of said coil to be approximately 90° out of phase with the oscillation of said oscillating structure.

12. The combination of claim 7 including means responsive to the amplitude of the oscillations of the oscillating structure for modifying the current flow in said coil to limit the maximum amplitude of oscillation of said oscillating structure.

13. In a spectrophotometer, the combination of a support, an oscillating structure mounted on said support, said oscillating structure comprising a first pair of reed members fixedly attached to said support, a pair of rectangular linking members attached to said reed members, a second pair of reed members attached to said linking members, and a platform carrying optical means attached to said second pair of reed members, one of said linking members including a magnetizable member; a coil mounted on said support and cooperating with said magnetizable member to magnetize said member to induce opposite magnetic poles at opposite ends thereof; at least one permanent magnet mounted on said support for repelling and attracting said magnetizable member depending upon the polarity of said induced magnetic poles so as to cause said oscillating structure to move between two positions; photoconductive means mounted on said support; a source of radiation mounted on said support; means associated with said oscillating structure for gradually varying the amount of radiation passing from said source of radiation to said photoconductive means as said oscillating structure moves between said two positions; amplifier means coupled to said photoconductive means for producing an output in response to changes in conductivity of said photoconductive means; and means for energizing said coil, said coil energizing means being controlled by the output of said amplifier means whereby said induced magnetic poles are periodically reversed thereby to cause said oscillating structure to oscillate.

14. The combination of claim 13 including means responsive to the amplitude of the oscillations of said oscillating structure for modifying the output of said amplifier means to limit the maximum amplitude of oscillation of said oscillating structure.

References Cited by the Examiner

UNITED STATES PATENTS

| | | | |
|---|---|---|---|
| 1,523,149 | 1/1925 | Wheeler | 88—61 |
| 2,551,833 | 5/1951 | Ewing | 88—14 |
| 2,868,060 | 1/1959 | Ackerman et al. | 88—14 |
| 2,946,879 | 7/1960 | Powers | 88—61 |

FOREIGN PATENTS 1,034,590  4/1953  France.

JEWELL H. PEDERSEN, *Primary Examiner.*

R. L. WIBERT, *Assistant Examiner.*